Patented Jan. 3, 1950

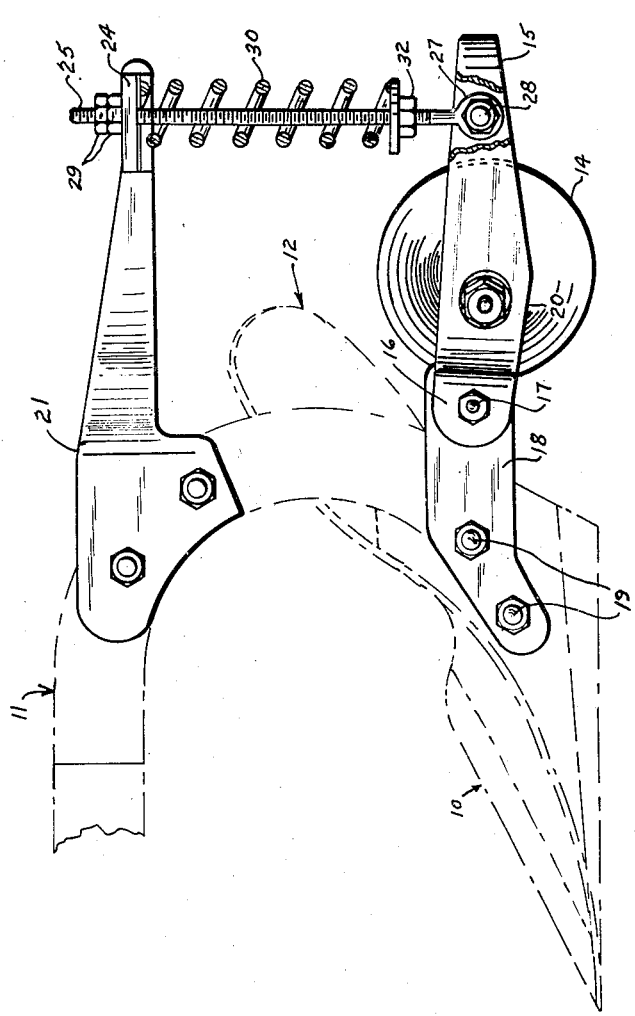
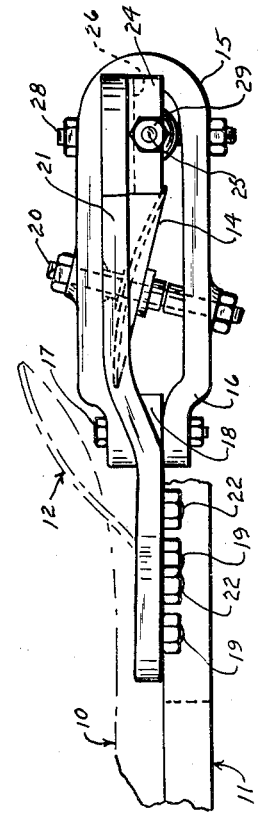

2,493,649

UNITED STATES PATENT OFFICE 2,493,649

WHEEL ATTACHMENT FOR PLOWS

Vivian P. Alloway, Craigmont, Idaho

Application July 1, 1946, Serial No. 680,541

2 Claims. (Cl. 97—79)

This invention relates to plows and more particularly to a wheel attachment for plows.

An object of this invention is to provide a wheel attachment for following a plow in the furrow for loosening the soil in the bottom of the furrow and for turning the soil in a direction opposite from the moldboard of the plow.

Another object of this invention is to provide a wheel or disc for attachment to a plow which is adapted to follow the plow in the furrow for the purpose of penetrating hard ground below the depth of the plowing, the wheel or disc being inclined oppositely from the plow moldboard for offsetting the side thrust created by the inclined moldboard.

Still another object of this invention is to provide a wheel or disc for following in the furrow behind a plow, the wheel or disc being inclined oppositely from the moldboard and means for adjusting the support for the wheel or disc in order to adjust the depth to which the wheel will penetrate the soil, and to provide spring means for pressing the wheel into the soil, thereby providing a resilient wheel support so the support and wheel may yield, permitting the wheel to roll over stones or other hard objects in the soil without damage to the wheel and without raising the plow from the earth.

With the above and other objects in view, my invention consists in the arrangement, combination and details of construction disclosed in the drawings and specification, and then more particularly pointed out in the appended claims.

In the drawings, wherein similar reference characters designate similar parts throughout the respective views:

Figure 1 is a side elevation, partly broken away, of a plow attachment constructed according to an embodiment of my invention, Figure 2 is a top plan view of the attachment.

Referring to the drawings, the numeral 10 designates generally a plow secured to a beam 11 for dragging the plow 10 behind a tractor or other motive power. The plow 10 is of the type which has an upwardly curving and inclined moldboard 12 for turning the soil to one side of the furrow. While drawing such a plow, the force of the soil on the moldboard 12 creates a thrust to one side of the line of motion of the plow 10. Also as the plow moves along a sort of crusted surface is formed at the bottom of the furrow, being packed by the bottom of the plow 10. In order to penetrate this crust and for penetrating the hard ground below the depth of the plow 10 it is desirable to provide a wheel or disc with a cutting edge to follow behind the plow in the furrow.

I have provided such a wheel or disc 14 and means for supporting this wheel or disc resiliently and adjustably behind the plow 10.

A wheel or disc 14 having a concavo-convex surface and a cutting edge is rotatably secured to a yoke 15 pivotally mounted on the plow 10. The yoke 15 consists of a U-shaped member having inwardly offset or joggled connecting ears 16 at the free ends of the arms thereof. A bolt 17 extends through the ears 16 and through the rear end of an attaching plate 18 which in turn is fixed at its forward end to the hooked beam 11 and plow 10 by bolts 19. The rear end of plate 18 is loosely held between the ears 16 so that the yoke 15 is pivotally connected to the plate 18.

The wheel or disc 14 is rotatably carried between the arms of the yoke 15 on an axle 20 which is supported therebetween at an oblique angle back from a line normal to the arms of the yoke 15 in the same general direction as the angle of the moldboard 12.

In order to support the pivotal yoke 15 there is provided a supporting member 21 fixed to the beam 11 above the plow 10 and attaching plate 18. The member 21 is secured to the beam 11 by bolts 22 and extends rearwardly substantially parallel to the ground line and level arm of the beam 11. A laterally extending portion 24 is carried by or formed on the rear end of the member 21 and is formed with a vertical opening through which a vertical connecting bolt 25 is adapted to engage. An L-shaped stiffening member 26 is fixed to the member 21 and lower side of the extension 24.

A connecting bolt 25 connects the yoke 15 with the supporting member 21. The bolt 25 is formed with an eye 27 at its lower end which loosely engages about a transverse bolt or rod 28 on the yoke 15. The upper end of the bolt 25 is loosely engaged in the opening in the extension 24 and extends thereabove and a pair of nuts 29 above the member 24 hold the rod 25 from sliding downwardly and the depth of penetration of the wheel or disc 14 is adjusted by the position of the nuts 29 on the bolt 25.

A spring 30 about the bolt 25 constantly urges the yoke 15 downwardly. The spring 30 bears at its upper end against the lower side of the member 21 and at its lower end against a disc 31 adjustably mounted on the bolt 25 by a nut 32.

In the use and operation of this attachment, the depth to which it is desired the wheel or disc 14 shall penetrate the soil in the furrow is adjusted by the nuts 29 on the upper end of the bolt 25 and the tension on the spring 30 is increased or decreased by the nut 32 which raises or lowers the disc 31 against which the lower end of the spring 30 bears. As the wheel 14 penetrates and loosens soil in the bottom of the furrow it is desirable to have this soil removed on the side of the furrow opposite the ridge formed by the earth moved by the plow 10. Therefore, the wheel 14 is inclined at an angle in a direction opposite from the angle of the moldboard and this opposite inclination also has a tendency to considerably reduce the side thrust of the inclined moldboard.

I do not mean to confine myself to the exact details of construction herein disclosed but claim all variations falling within the purview of the appended claims.

Having thus described my invention, what I claim is:

1. An attachment for a plow comprising a U-shaped yoke, a concavo-convex cutting wheel rotatably carried by said yoke, the axle for said wheel being supported at an oblique angle on said yoke, an attaching plate fixed to the lower end of said plow, said yoke pivotally connected to the rear end of said plate, a rearwardly extending supporting member fixed to the upper end of the plow beam, an eye bolt loosely connected to said yoke and extending through said member, a disc adjustably carried by said eye bolt, a spring about said eye bolt between said member and said disc for constantly urging said yoke downwardly, and nuts on the upper end of said eye bolt for adjusting the position of said yoke relative to said member.

2. An attachment for a plow comprising a U-shaped yoke, a concavo-convex cutting wheel rotatably carried by said yoke, the axle for said wheel being supported at an oblique angle on said yoke, an attaching plate fixed to the lower end of said plow, said yoke pivotally connected to the rear end of said plate, a rearwardly extending supporting member fixed to the upper end of the plow beam, an eye bolt loosely connected to said yoke and extending through said member, a spring about said eye bolt bearing at one end against said supporting member for constantly urging said eye bolt downwardly, and means for tensioning said spring.

VIVIAN P. ALLOWAY.

REFERENCES CITED

The following references are of record in the file of this patent:

UNITED STATES PATENTS

| Number | Name | Date |
|---|---|---|
| 819,733 | Crisler | May 8, 1906 |
| 991,855 | Kenworthy | May 9, 1911 |
| 1,062,246 | McCann | May 20, 1913 |